(12) United States Patent
Fujimoto et al.

(10) Patent No.: US 12,314,649 B2
(45) Date of Patent: May 27, 2025

(54) CABLE ROUTE SETTING METHOD

(71) Applicant: Nippon Telegraph and Telephone Corporation, Tokyo (JP)

(72) Inventors: Tatsuya Fujimoto, Musashino (JP); Tomohiro Kawano, Musashino (JP); Kuniaki Terakawa, Musashino (JP); Kazunori Katayama, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 603 days.

(21) Appl. No.: 17/639,497

(22) PCT Filed: Sep. 4, 2019

(86) PCT No.: PCT/JP2019/034849
§ 371 (c)(1),
(2) Date: Mar. 1, 2022

(87) PCT Pub. No.: WO2021/044556
PCT Pub. Date: Mar. 11, 2021

(65) Prior Publication Data
US 2022/0327274 A1    Oct. 13, 2022

(51) Int. Cl.
*G06F 30/392* (2020.01)
*H02G 1/06* (2006.01)

(52) U.S. Cl.
CPC ............ *G06F 30/392* (2020.01); *H02G 1/06* (2013.01)

(58) Field of Classification Search
CPC ................................ G06F 30/392; H02G 1/06
USPC ......................................................... 716/126
See application file for complete search history.

(56) References Cited

U.S. PATENT DOCUMENTS

| | | | |
|---|---|---|---|
| 2010/0235147 A1* | 9/2010 | Okada | G06F 30/18 703/1 |
| 2015/0088579 A1* | 3/2015 | Gerphagnon | G06Q 10/06313 705/7.23 |
| 2016/0025781 A1* | 1/2016 | Kumeta | H05K 7/20745 702/182 |
| 2019/0008072 A1* | 1/2019 | Morgan | H01H 21/24 |
| 2020/0358277 A1* | 11/2020 | Kewitsch | G02B 6/48 |

(Continued)

FOREIGN PATENT DOCUMENTS

JP    2006301895    11/2006

OTHER PUBLICATIONS

Bhopte et al., "Effect of under Floor Blockages on Data Center Performance," Thermal and Thermomechanical Phenomena in Electrics Systems, May 30, 2006, 8 pages.

*Primary Examiner* — Jack Chiang
*Assistant Examiner* — Suchin Parihar
(74) *Attorney, Agent, or Firm* — Fish & Richardson P.C.

(57) ABSTRACT

A cable route setting method according to the present disclosure includes: defining unit areas in a floor where a cable is to be wired; and specifying a cable route of the cable passing through each of the unit areas to any of a route between a left side and a right side, a route between the left side and an upper side, a route between the upper side and the right side, a route between the left side and a lower side, a route between the lower side and the right side, a route between the upper side and the lower side, a route between the left side and a center, a route between the right side and the center, a route between the upper side and the center, and a route between the lower side and the center.

12 Claims, 15 Drawing Sheets

(56) References Cited

U.S. PATENT DOCUMENTS

| | | | | |
|---|---|---|---|---|
| 2021/0076529 | A1* | 3/2021 | Pachoud | G06F 1/26 |
| 2022/0071046 | A1* | 3/2022 | Chapel | H05K 7/1492 |
| 2022/0253806 | A1* | 8/2022 | Yamamoto | G06V 20/66 |
| 2022/0318448 | A1* | 10/2022 | Terakawa | G06F 30/28 |
| 2023/0105523 | A1* | 4/2023 | Rogers | H04L 67/12 |
| | | | | 29/592.1 |
| 2023/0298488 | A1* | 9/2023 | Nakanelua | H02G 1/06 |
| | | | | 40/316 |

* cited by examiner

| | LEFT SIDE | RIGHT SIDE | UPPER SIDE | LOWER SIDE |
|---|---|---|---|---|
| CENTER | G | H | J | K |

Fig. 8

|   | LEFT SIDE | RIGHT SIDE | UPPER SIDE | LOWER SIDE | CENTER |
|---|---|---|---|---|---|
| LEFT SIDE |  | A | B | D | G |
| RIGHT SIDE |  |  | C | E | H |
| UPPER SIDE |  |  |  | F | J |
| LOWER SIDE |  |  |  |  | K |

Fig. 10

IN-UNIT AREA CABLE TABLE

| UNIT AREA NUMBER | CABLE ID | CABLE ROUTE |
|---|---|---|
| 1-1 | 0001 | A |
| 1-1 | 0005 | C |
| 1-1 | 0009 | B |
| 1-1 | 0015 | C |
| ⋮ | ⋮ | ⋮ |

Fig. 11

CABLE INFORMATION TABLE

| CABLE ID | CABLE CROSS-SECTIONAL AREA | CONSTRUCTION ID | CABLE TYPE | NUMBER OF LINES | CABLE LENGTH |
|---|---|---|---|---|---|
| 0001 | 50[m2] | 100521 | SMF | 2 [CORES] | 45 [m] |
| 0002 | 100[m2] | 101327 | UTP | 1 [LINE] | 24 [m] |
| 0003 | 200[m2] | 162421 | MMF | 12 [CORES] | 39 [m] |
| ⋮ | ⋮ | ⋮ | ⋮ | ⋮ | |

CONSTRUCTION INFORMATION TABLE

| CONSTRUCTION ID | DESIGNER | BUILDER | CONSTRUCTION DATE | .... |
|---|---|---|---|---|
| 000001 | A | A | 20yy.mm.dd | |
| 000002 | B | B | 20yy.mm.dd | |
| 000003 | C | γ | 20yy.mm.dd | |
| ⋮ | ⋮ | ⋮ | ⋮ | |

(a) CABLE WIRING STATE (b) APPROXIMATION OF CABLES TO
RECTANGULAR PARALLELEPIPEDS

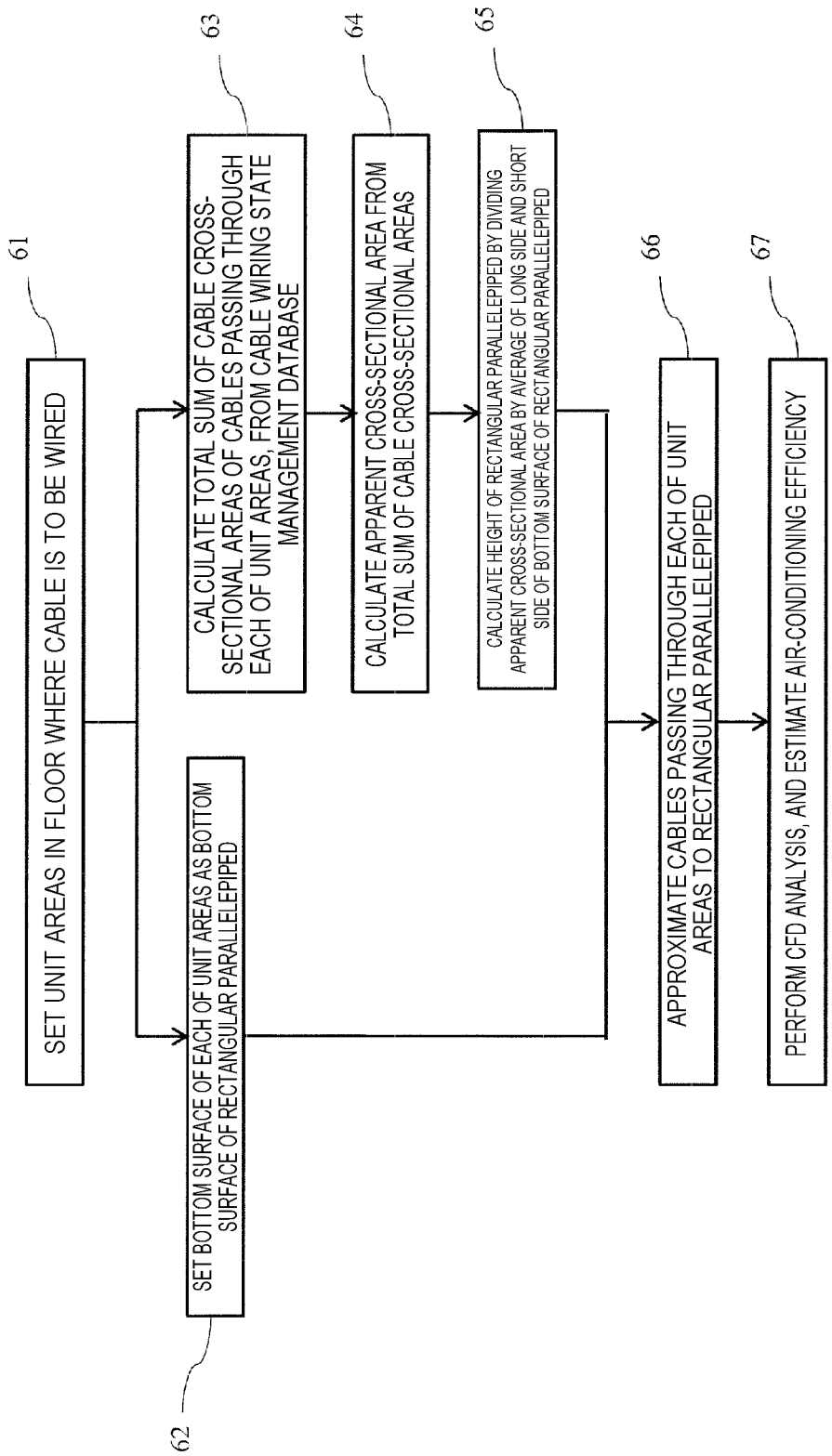

CABLE ROUTE SETTING METHOD

CROSS-REFERENCE TO RELATED APPLICATIONS

This application is a National Stage application under 35 U.S.C. § 371 of International Application No. PCT/JP2019/034849, having an International Filing Date of Sep. 4, 2019. The disclosure of the prior application is considered part of the disclosure of this application, and is incorporated in its entirety into this application.

TECHNICAL FIELD

The present disclosure relates to a cable wiring designing technique in a communication station building or a data center.

BACKGROUND ART

A communication station building and a data center are constantly required to reduce operation cost and to improve workability and maintainability. A floor is configured as a double floor and communication cables and power cables are laid in a space under the double floor because of limitation of a floor height and in order to effectively use an existing building. The space under the double floor is simultaneously used as a passage through which cold air cooling communication devices, servers, and the like passes. The cold air generated from an air-conditioning device is supplied to the communication devices, the servers, and the like through the space under the double floor and through floor panels with holes disposed near racks mounted with the communication devices, the servers, and the like.

In wiring in the space under the double floor, a route of cables is designed as short as possible in order to suppress material costs. As a technique for such a design, a system that automatically designs an optimum wiring route satisfying a cable cost and some conditions has been examined (see Patent Literature 1).

Further, influence of a state of an obstacle present in the space under the double floor on air-conditioning efficiency and an air-conditioning cost has been studied (see Non-Patent Literature 1). In Non-Patent Literature 1, thermo-fluid (Computational Fluid Dynamics: CFD) analysis is performed on a refrigerant pipe extremely larger than a cable or the like present in the space under the double floor, and arrangement and design of the refrigerant pipe least affecting the air conditioning are examined.

CITATION LIST

Patent Literature

Patent Literature 1: Japanese Patent Laid-Open No. 2006-301895

Non-Patent Literature

Non-Patent Literature 1: Siddharth Bhopte, et al., "EFFECT OF UNDER FLOOR BLOCKAGES ON DATA CENTER PERFORMANCE", Thermal and Thermomechanical Phenomena in Electrics Systems, 2006.

SUMMARY OF THE INVENTION

Technical Problem

There is an issue that locations of cables wired in a floor are not clear because a route of the wired cables is not managed.

Further, there is an issue that a total sum of cable cross-sectional areas as an index representing density of the cables wired in the floor is not clear.

Further, in wiring of the communication cables and the power cables, a route is selected without taking into consideration influence of the cables on the air-conditioning efficiency. Therefore, there is an issue that bias occurs in areas through which the cables pass. As a result, a flow of the cold air is blocked and the air-conditioning efficiency is deteriorated.

In some cases, the CFD analysis using a calculator is used to evaluate influence of an obstacle present in the space under the double floor on the air-conditioning efficiency (see Non-Patent Literature 1). A single cable is thin, but stacked cables become an obstacle blocking the cold air. When the cables are defined one by one in CFD analysis software, it is necessary to perform the CFD analysis after an analysis region is divided into a finer mesh, which leads to an issue that a calculation amount becomes huge.

Means for Solving the Problem

The present disclosure is to solve the above-described issues, and unit areas are set in a floor where a cable is to be wired and a cable route of the cable passing through the unit areas is finely specified.

More specifically, a cable route setting method according to the present disclosure includes: defining unit areas in a floor where a cable is to be wired; and specifying a cable route of the cable passing through each of the unit areas to any of a route between a left side and a right side, a route between the left side and an upper side, a route between the upper side and the right side, a route between the left side and a lower side, a route between the lower side and the right side, a route between the upper side and the lower side, a route between the left side and a center, a route between the right side and the center, a route between the upper side and the center, and a route between the lower side and the center.

The present disclosure is to solve the above-described issues, and unit areas are set in a floor where a cable is to be wired and information on cross-sectional areas of respective cables passing through each of the unit areas is managed.

More specifically, a cable wiring state management database according to the present disclosure includes: an in-unit area cable table at least including information on unit area numbers of respective unit areas set in a floor where a cable is to be wired, and information on cable IDs of respective cables passing through each of the unit areas; and a cable information table at least including information on the cable IDs and information on cable cross-sectional areas of the respective cables.

The present disclosure is to solve the above-described issues, and unit areas are set in a floor where a cable is to be wired and an optimum route is selected so as not to generate bias in cables passing through each of the unit areas.

More specifically, a cable wiring method according to the present disclosure includes: setting both end points for a cable to be laid among unit areas of a floor where the cable is to be wired; calculating a number of cables in each of the unit areas included in a route from one of the end points to another end point not passing through a same unit area twice or more, from a database including an in-unit area cable table that includes information on unit area numbers of the respective unit areas set in the floor where the cable is to be wired and information on cable IDs of respective cables passing through each of the unit areas; and selecting a route passing through a smallest number of unit areas having the number of cables greater than or equal to a threshold, among routes where the number of cables is calculated.

The present disclosure is to solve the above-described issues, and unit areas are set in a floor where a cable is to be wired and CFD analysis is performed by approximating cables passing through each of the unit areas to a rectangular parallelepiped.

More specifically, a CFD (Computational Fluid Dynamics) analysis method according to the present disclosure includes: setting unit areas in a floor where a cable is to be wired; setting a bottom surface of each of the unit areas as a bottom surface of a rectangular parallelepiped; calculating a total sum of cable cross-sectional areas of cables passing through each of the unit areas, from a cable wiring state management database; calculating an apparent cross-sectional area by dividing the calculated total sum of cable cross-sectional areas by density of the cables; calculating a height of the rectangular parallelepiped by dividing the apparent cross-sectional area by an average of a long side and a short side of the bottom surface of the rectangular parallelepiped; and performing CFD analysis by approximating the cables passing through each of the unit areas to the rectangular parallelepiped having the bottom surface and the height.

Effects of the Invention

Utilizing the cable route setting method according to the present disclosure makes it possible to perform management making locations of existing cables clear.

Searching the cable wiring state management database according to the present disclosure makes it possible to make the locations of the cables wired in the floor and the total sum of cable cross-sectional areas clear.

Utilizing the cable wiring method according to the present disclosure makes it possible to select the optimum route not generating bias in the areas where the cables pass.

The CFD analysis method according to the present disclosure approximates the cables passing through each of the unit areas to the rectangular parallelepiped, which makes it possible to reduce a calculation amount.

BRIEF DESCRIPTION OF DRAWINGS

FIG. 8 illustrates an example of a structure of a cable wiring state management database.

FIG. 10 illustrates an example of an in-unit area cable table.

FIG. 11 illustrates an example of a cable information table.

FIG. 20 illustrates an example of a procedure of approximating the cables to the rectangular parallelepipeds.

DESCRIPTION OF EMBODIMENTS

Figure 1:
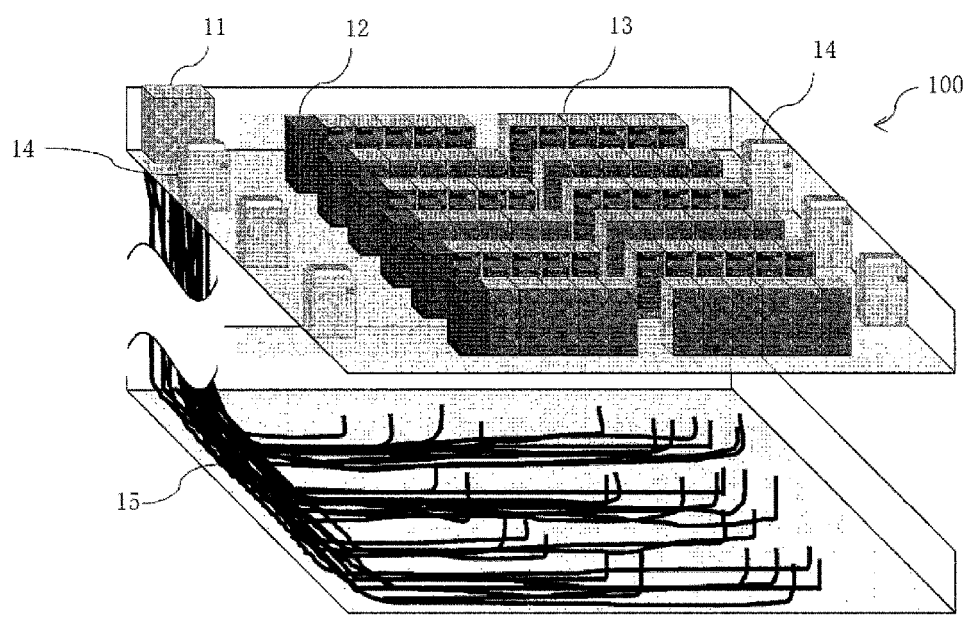
FIG. 1 illustrates a floor model of a communication station building or a data center.

Embodiments of the present disclosure are described in detail below with reference to drawings. Note that the present disclosure is not limited to the embodiments described below. These embodiments are merely illustrative, and the present disclosure can be implemented with various modifications and improvements based on knowledge of a person skilled in the art. Note that, in the present specification and the drawings, the same components are denoted by the same reference numerals.

(Cable Route Setting Method)

Figure 2:
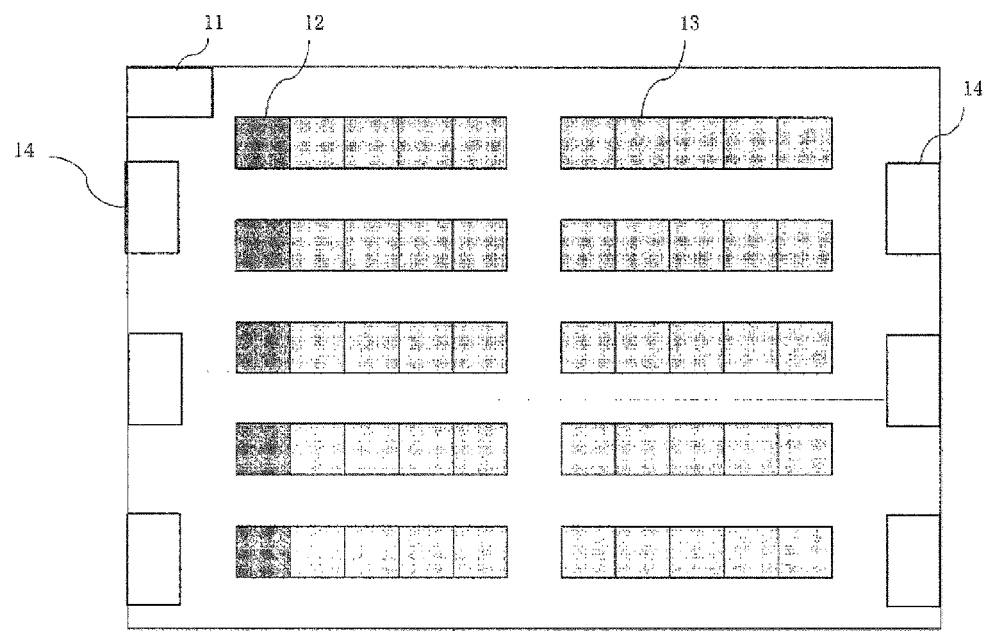
FIG. 2 is a floor bird's-eye view of the communication station building or the data center.
Figure 3:
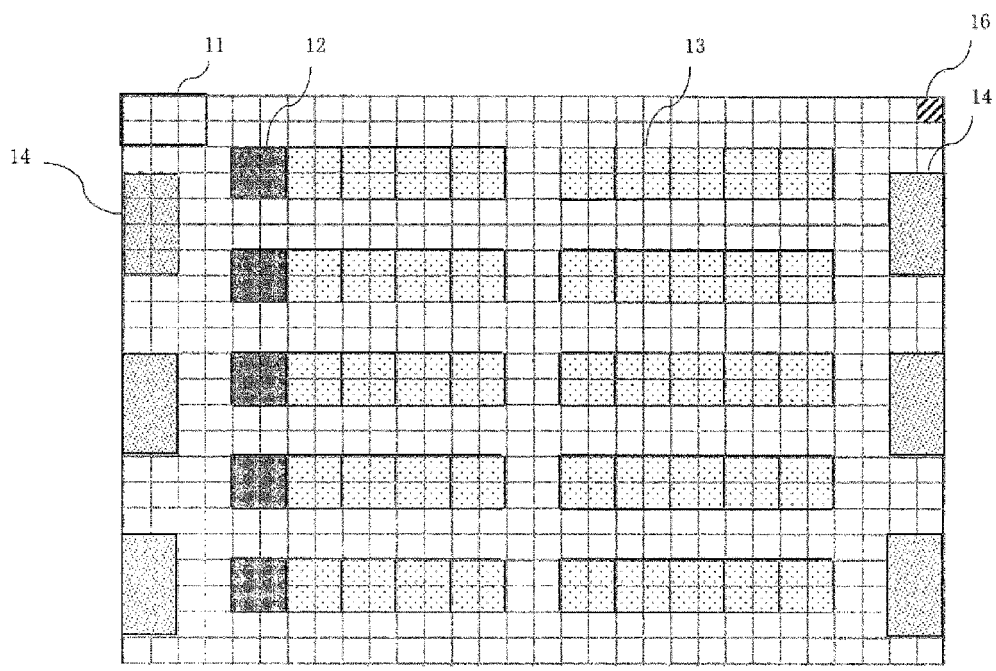
FIG. 3 illustrates an example in which unit areas are set in the floor bird's-eye view.

FIG. 1 illustrates a floor model of a communication station building or a data center presupposing application of the present disclosure, FIG. 2 is a floor bird's-eye view of the communication station building or the data center, and FIG. 3 illustrates an example in which unit areas are defined in the floor bird's eye view. In FIG. 1, FIG. 2, and FIG. 3, reference numeral 11 denotes a communication cable integrated point, reference numeral 12 denotes a power cable integrated point, reference numeral 13 denotes a rack for communication devices and servers, reference numeral 14 denotes an air-conditioning device, reference numeral 15 denotes a cable, reference numeral 16 denotes a unit area, and reference numeral 100 denotes a floor model.

As illustrated in FIG. 1, the communication cables 15 are wired under a double floor between the racks 13 for the communication devices and the servers and the communication cable integrated point 11. The power cables 15 are wired under the double floor between the racks 13 for the communication devices and the servers and the power cable integrated points 12. Cold air is supplied from the air-conditioning devices 14 to the racks 13 for the communication devices and the servers through a space under the double floor.

FIG. 2 is a floor bird's-eye view, and FIG. 3 is a floor bird's-eye view in which the unit areas for wiring management are defined in a lattice shape. At this time, the cables wired in the space under the double floor are recorded and managed for each of the unit areas. Each of the unit areas may have a rectangular shape or a square shape. A size of each of the unit areas may be adjusted to a panel size of the double floor.

In a cable route setting method according to the present embodiment, the unit areas are defined in a floor where a cable is to be wired, and a cable route of the cable passing through each of the unit areas is specified to any of a route between a left side and a right side, a route between the left side and an upper side, a route between the upper side and the right side, a route between the left side and a lower side, a route between the lower side and the right side, a route between the upper side and the lower side, a route between the left side and a center, a route between the right side and the center, a route between the upper side and the center, and a route between the lower side and the center.

Figures 4, 5:
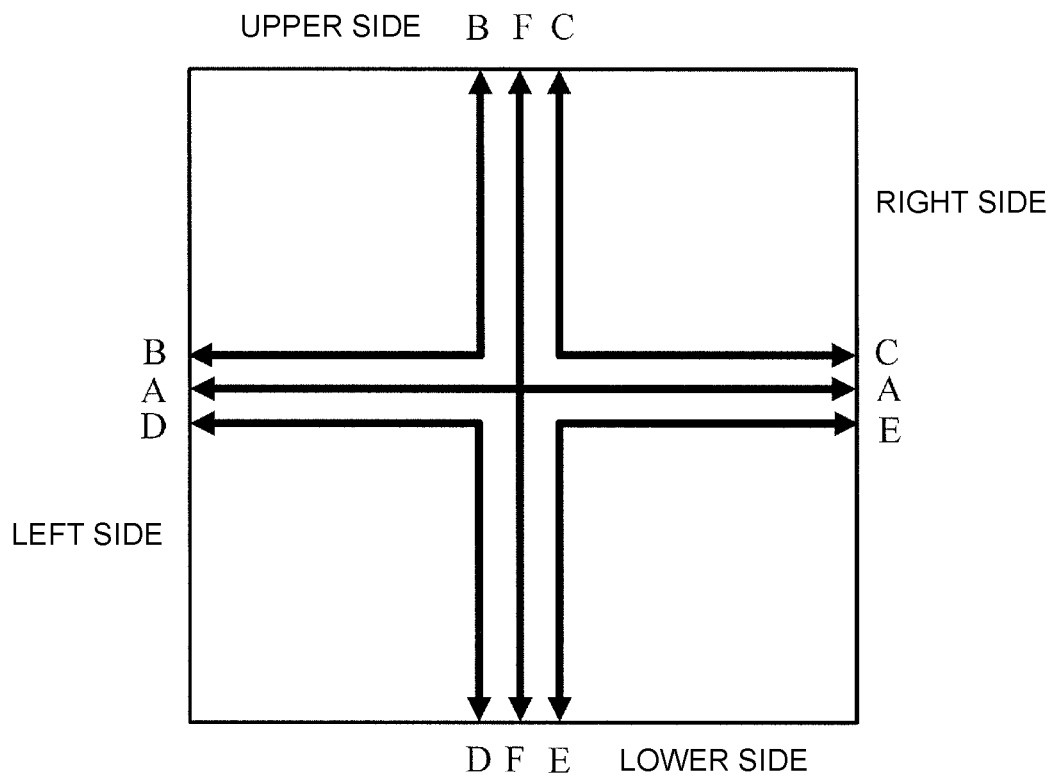
FIG. 4 is a diagram illustrating cable routes passing through one of the unit areas.
FIG. 5 illustrates a part of a table of the cable routes passing through one of the unit areas.

FIG. 4 illustrates examples of the cable route passing through one of the unit areas arranged in the lattice shape. In FIG. 4, a side on an apparent upper side is defined as the upper side, a side on an apparent lower side is defined as the lower side, a side on an apparent left side is defined as the left side, and a side on an apparent right side is defined as the right side. Reference symbol A denotes a cable route between the left side and the right side, reference symbol B denotes a cable route between the left side and the upper side, reference symbol C denotes a cable route between the upper side and the right side, reference symbol D denotes a cable route between the left side and the lower side, reference symbol E denotes a cable route between the lower side and the right side, and reference symbol F denotes a cable route between the upper side and the lower side. FIG. 5 is a table to manage the cable routes in FIG. 4 as a part of an in-unit area cable table.

Figures 6, 7:
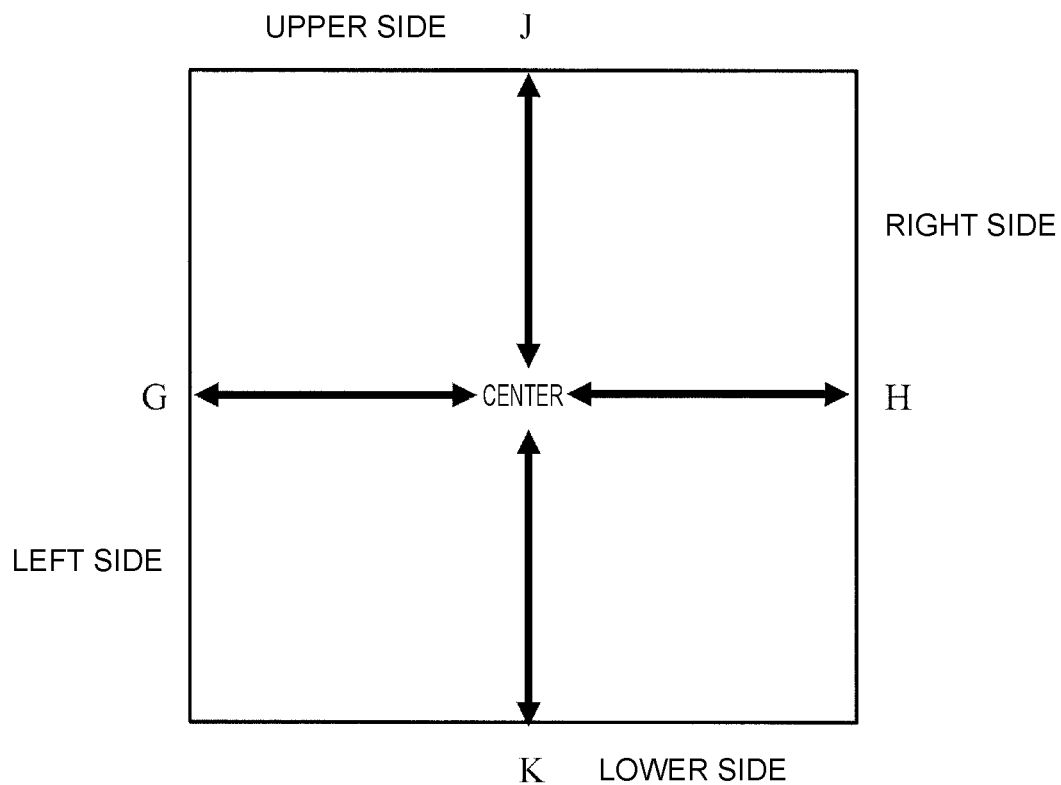
FIG. 6 is a diagram illustrating cable routes passing through one of the unit areas.
FIG. 7 illustrates a part of a table of the cable routes passing through one of the unit areas.

FIG. 6 illustrates other examples of the cable route passing through one of the unit areas arranged in the lattice shape. FIG. 6 illustrates a case where a cable is wired to the rack 13 for the communication devices and the servers installed on the double floor. In other words, the cable from the rack 13 is wired between the center and each of the sides. Reference symbol G denotes a cable route between the left side and the center, reference symbol H denotes a cable route between the right side and the center, reference symbol J denotes a cable route between the upper side and the center, and reference symbol K denotes a cable route between the lower side and the center. FIG. 7 is a table to manage the cable routes in FIG. 6 as a part of the in-unit area cable table.

The table to manage the cable routes as a part of the in-unit area cable table in FIG. 5 and the table to manage the cable routes as a part of the in-unit area cable table in FIG. 7 may be integrated to a management table in FIG. 8.

As described above, the unit areas are set in the floor where a cable is to be wired, and the cable route of the cable passing through each of the unit areas is finely specified, which makes it possible to perform management making locations of wired cables clear.

(Cable Wiring State Management Database)

A cable wiring state management database according to the present embodiment includes the in-unit area cable table and a cable information table. The in-unit area cable table at least includes information on unit area numbers of the respective unit areas set in the floor where a cable is to be wired, and information on cable IDs of respective cables passing through each of the unit areas. The cable information table at least includes information on the cable IDs and information on cable cross-sectional areas of the respective cables.

Figure 9:
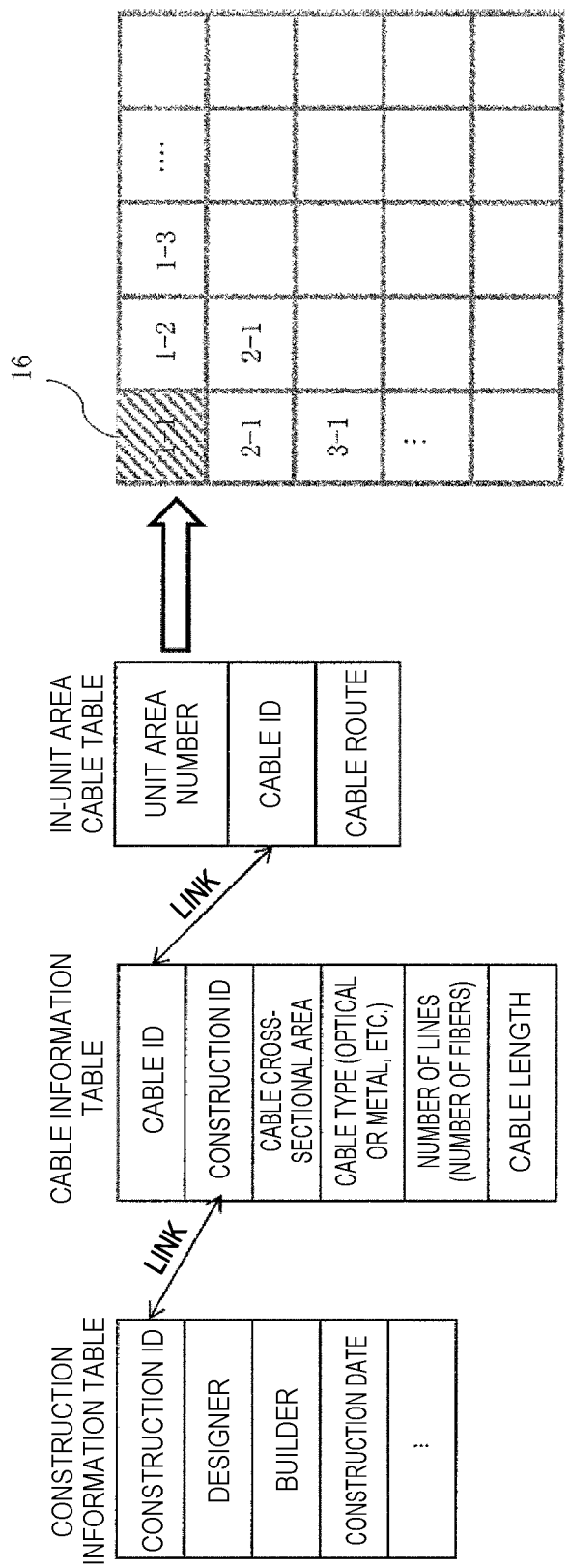
FIG. 9 illustrates an example of unit area numbers.

FIG. 9 illustrates an example of the cable wiring state management database and examples of the unit area numbers of the respective unit areas. In FIG. 9, the in-unit area cable table at least includes the information on the unit area numbers of the respective unit areas set in the floor where a cable is to be wired, and the information on the cable IDs of the respective cables passing through each of the unit areas. The cable information table at least includes the information on the cable IDs and the information on the cable cross-sectional areas of the respective cables. The cable IDs of the in-unit area cable table and the cable IDs of the cable information table are linked with each other. The cable wiring state management database may include a construction information table.

The cable wiring state management database includes the plurality of tables, which makes it possible to uniquely update the information included in each of the tables.

The locations of the cables wired in the floor can be made clear by referring to the in-unit area cable table and searching the cable IDs present in each of the unit area numbers. Further, a total sum of cable cross-sectional areas of the cables in each of the unit areas can be made clear by adding the cable cross-sectional areas corresponding to the respective cable IDs of the cable information table lined with the cable IDs of the in-unit area cable table.

An example of impartment of the unit area numbers is illustrated on a right part in FIG. 9. The unit area numbers of the in-unit area cable table mean numbers illustrated in a matrix on the right part in FIG. 9.

FIG. 10 illustrates an example of the in-unit area cable table. The in-unit area cable table at least includes the information on the unit area numbers and the information on the cable IDs. The in-unit area cable table may further include information on cable routes specified by the cable route setting method according to the above-described embodiment. When the in-unit area cable table includes the information on the cable routes, it is possible to perform management making the locations of the existing cables clear.

FIG. 11 illustrates an example of the cable information table. The cable information table at least includes the information on the cable IDs and the information on the cable cross-sectional areas. The cable IDs of the cable information table are linked with the cable IDs of the in-unit area cable table. The cable information table may include information on construction IDs, information on cable types, information on the number of lines, and information on cable lengths. The information facilitates grasping of a detail of each of the cables.

Figures 12, 13:
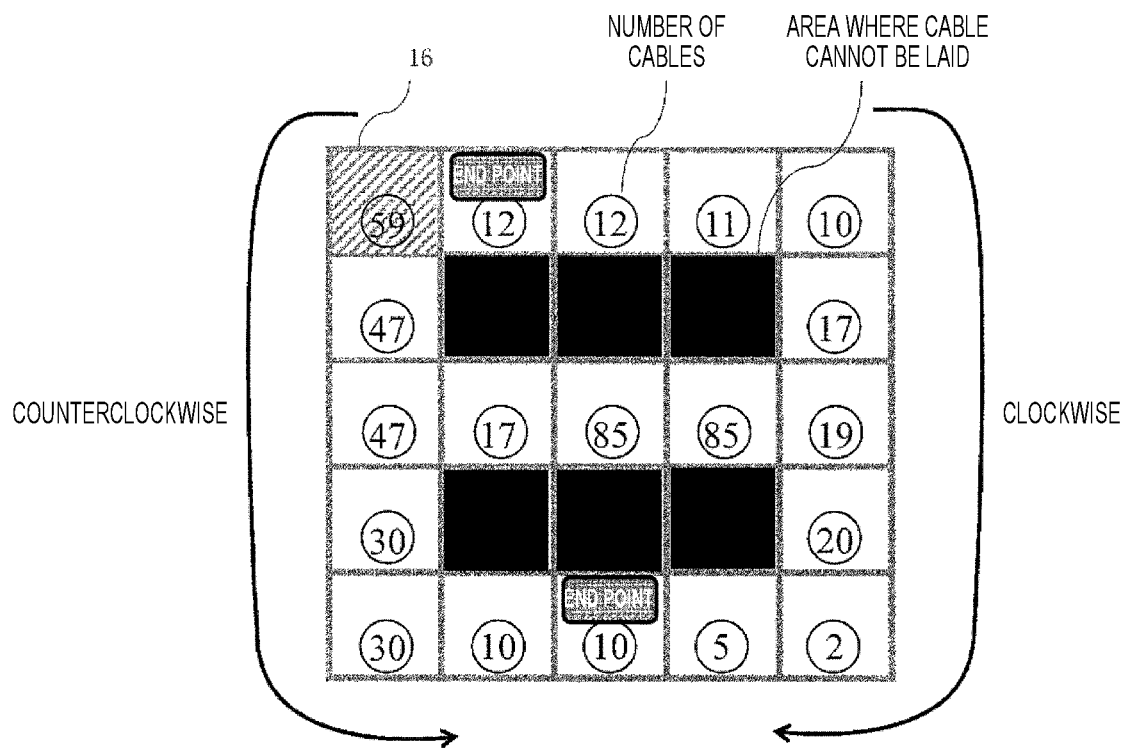
FIG. 12 illustrates an example of a construction information table.
FIG. 13 illustrates an example of the number of cables passing through each of the unit areas.

FIG. 12 illustrates an example of the construction information table. In a case where the cable wiring state management database includes the construction information table, the cable information table includes information on the construction IDs. The construction IDs of the construction information table are linked with the construction IDs of the cable information table. The construction information table includes information on the construction IDs, information on designers, information on builders, and information on construction dates. A designer, a builder, and a construction date are made clear by referring to the construction information table linked with the construction ID of the cable information table. It is possible to estimate from the construction date whether a target cable is stacked on or under other cables, which enables a worker to smoothly remove the target cable.

Utilizing the cable wiring state management database according to the present embodiment in the cable wiring method described next makes it possible to select an optimum route so as not to generate bias in cables passing through each of the unit areas.

(Cable Wiring Method 1)

In a cable wiring method according to the present embodiment, both end points for a cable to be laid are set among unit areas of a floor where the cable is to be wired, the number of cables in each of the unit areas included in a route from one of the end points to the other end point not passing through the same unit area twice or more is calculated from the database including the in-unit area cable table that includes the information on the unit area numbers of the respective unit areas set in the floor where the cable is to be wired, and the information on the cable IDs of the respective cables passing through each of the unit areas, and a route passing through the smallest number of unit areas having the number of cables greater than or equal to a threshold is selected among routes where the number of cables is calculated.

In the above-described cable wiring method, in a case where a plurality of routes is selected, a route passing through the smallest number of unit areas is selected among the plurality of routes.

FIG. 13 illustrates an example of the number of cables passing through each of the unit areas. In FIG. 13, reference numeral 16 represents a size of each of the unit areas. Each of numbers in a matrix represents the calculated number of cables passing through the corresponding unit area. A black-painted portion represents an area where a cable cannot be laid. The number of cables passing through each of the unit areas is obtained by extracting the number of cables included in each of the unit area numbers of the in-unit area cable table. The in-unit area cable table is included in the cable wiring state management database, and includes the information on the unit area numbers of the respective unit areas set in the floor where a cable is to be wired and the information on the cable IDs of the respective cables passing through each of the unit areas.

Figure 14:
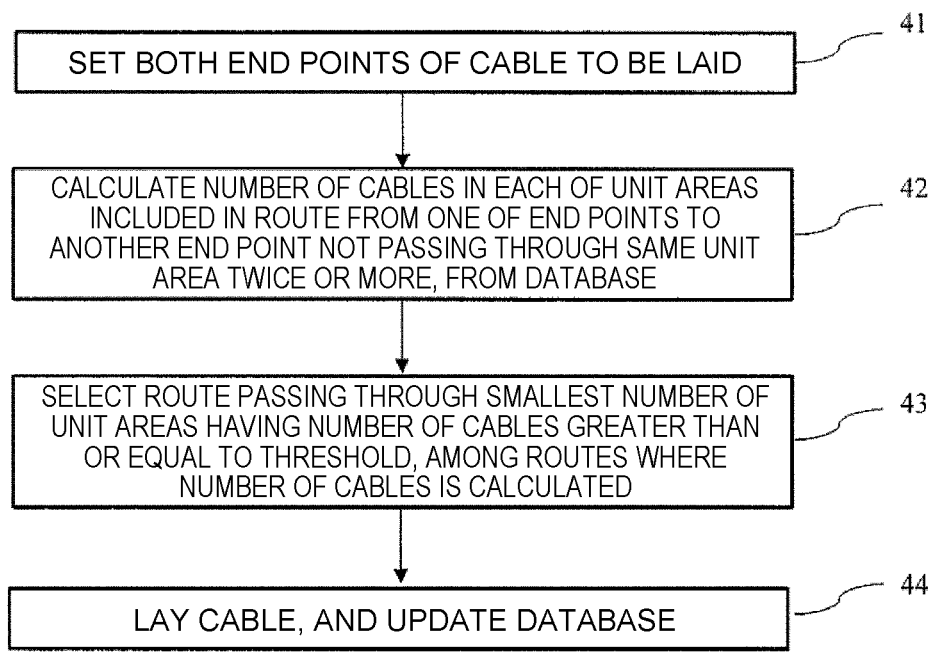
FIG. 14 illustrates an example of a procedure of a cable wiring method.

FIG. 14 illustrates an example of a procedure of the cable wiring method. Both end points (two end points in FIG. 13) for a cable to be laid are set among the unit areas of the floor where the cable is to be wired (step 41). Next, the number of cables in each of the unit areas included in a route from one of the end points to the other end point not passing through the same unit area twice or more is calculated from the database including the in-unit area cable table that includes the information on the unit area numbers of the respective unit areas set in the floor where the cable is to be wired and the information on the cable IDs of the respective cables passing through each of the unit areas (step 42). Among routes where the number of cables is calculated, a route passing through the smallest number of unit areas having the number of cables greater than or equal to the threshold is selected (step 43). The threshold of the number of cables is optionally set. After the route is selected, the cable is actually laid, and the above-described database is updated (step 44). The in-unit area cable table is illustrated in FIG. 10 according to the above-described embodiment.

For example, in FIG. 13, the threshold of the number of cables is set to 30. To simplify the route connecting the two end points, two routes of a clockwise route and a counterclockwise route from an upper end point in FIG. 13 as a starting point are assumed. The clockwise route and the counterclockwise route are compared. In the clockwise route, the unit area where the number of cables is greater than or equal to the threshold 30 is not present. In the counterclockwise route, the number of cables becomes greater than or equal to the threshold 30 in five unit areas, and the numbers of cables of the respective unit areas are 59, 47, 47, 30, and 30. Accordingly, the clockwise route is selected.

Utilizing the cable wiring method according to the present disclosure makes it possible to wire a cable so as not to generate bias in the areas where the cables pass. As a result, it is possible to improve air-conditioning efficiency and to improve workability in removal of a cable.

Figure 15:
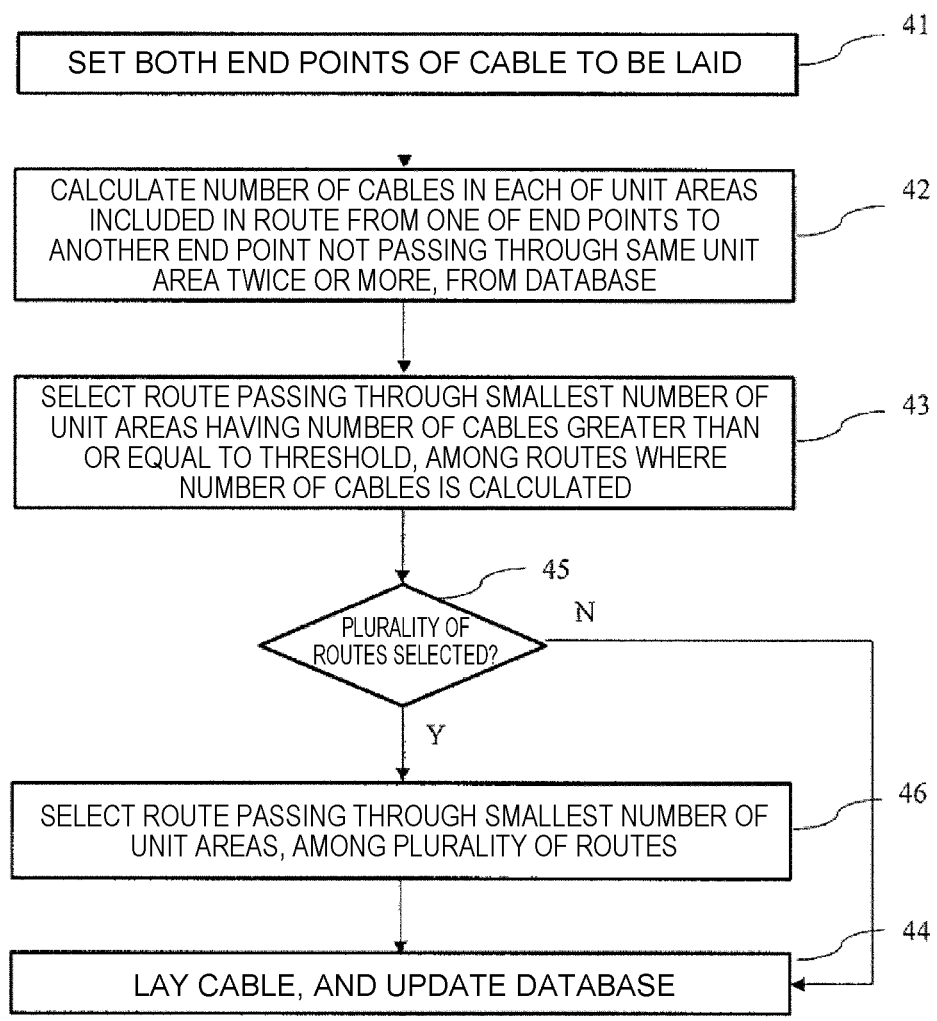
FIG. 15 illustrates an example of the procedure of the cable wiring method.

FIG. 15 illustrates an example of the procedure of the cable wiring method. In FIG. 15, steps 41, 42, 43, and 44 are similar to the steps in FIG. 14. In selection of the route passing through the smallest number of unit areas having the number of cables greater than or equal to the threshold (step 43) in FIG. 15, in a case where a plurality of routes is selected ("Y" in step 45), a route passing through the smallest number of unit areas is selected among the plurality of routes (step 46). In a case where one route is selected in step 43 ("N" in step 45), the procedure is similar to the procedure in FIG. 14. After one route is selected, the cable is actually laid, and the above-described database is updated (step 44).

For example, in FIG. 13, the threshold of the number of cables is set to 11. To simplify the route connecting the two end points, two routes of a clockwise route and a counterclockwise route from an upper end point in FIG. 13 as a starting point are assumed. The clockwise route and the counterclockwise route are compared. In the clockwise route, the number of cables becomes greater than or equal to the threshold 11 in six unit areas, and the numbers of cables of the respective unit areas are 12, 12, 11, 17, 19, and 20. In the counterclockwise route, the number of cables becomes greater than or equal to the threshold 11 in six unit areas, and the numbers of cables of the respective unit areas are 12, 59, 47, 47, 30, and 30. A plurality of routes is selected. In the clockwise route and the counterclockwise route, the numbers of unit areas where the cables pass are respectively 10 and 8. Accordingly, the counterclockwise route is finally selected.

Utilizing the cable wiring method according to the present disclosure makes it possible to wire a cable so as not to generate bias in the areas where the cables pass. As a result, it is possible to improve air-conditioning efficiency and to improve workability in removal of a cable.

(Cable Wiring Method 2)

In a cable wiring method according to the present embodiment, both end points for a cable to be laid are set among unit areas of a floor where the cable is to be wired, a total sum of cable cross-sectional areas of cables in each of unit areas included in a route from one of the end points to the other end point not passing through the same unit area twice or more is calculated from the cable wiring state management database according to the above-described embodiment, and a route passing through the smallest number of unit areas having the total sum of cable cross-sectional areas greater than or equal to a threshold is selected among routes where the total sum of cable cross-sectional areas is calculated.

In the above-described cable wiring method, in a case where a plurality of routes is selected, a route passing through the smallest number of unit areas is selected among the plurality of routes.

Figure 16:
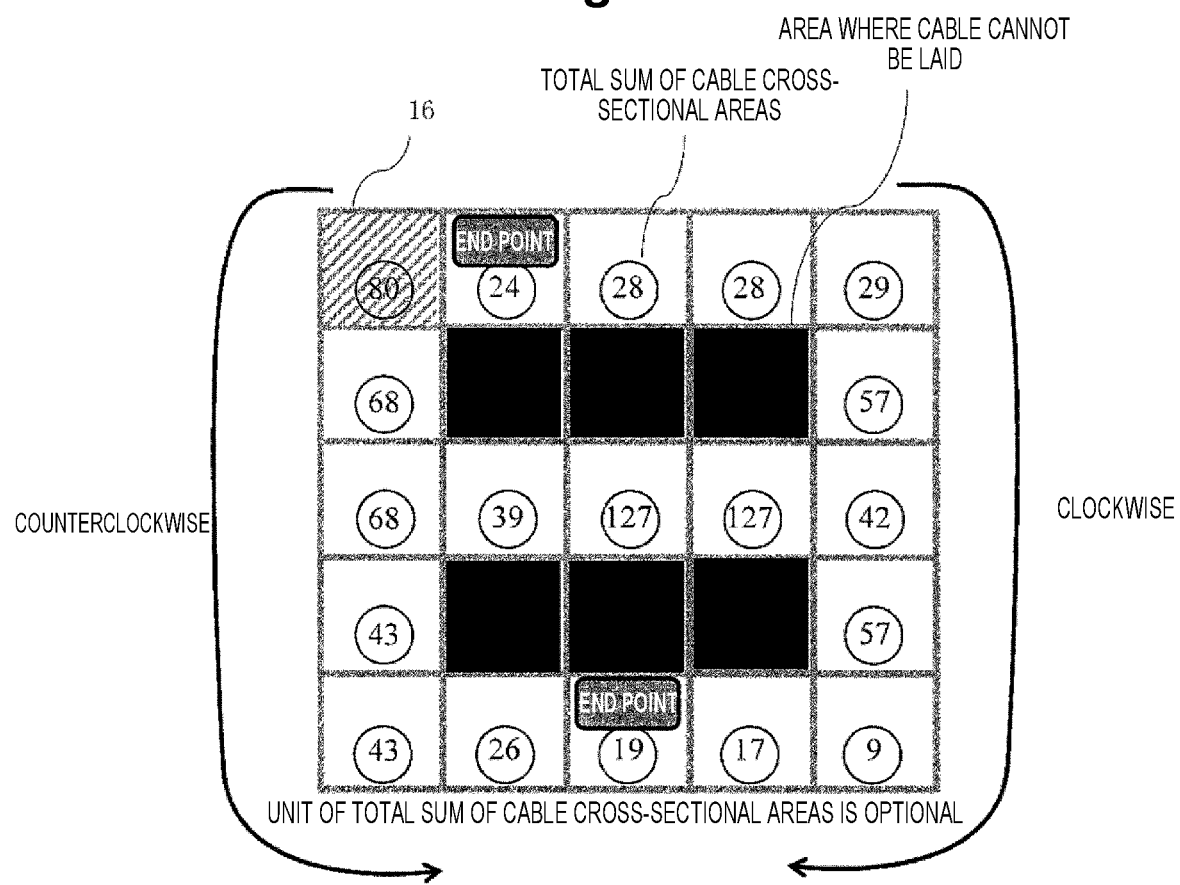
FIG. 16 illustrates an example of a total sum of cable cross-sectional areas of the cables passing through each of the unit areas.

FIG. 16 illustrates an example of the total sum of cable cross-sectional areas of the cables passing through each of the unit areas. In FIG. 16, reference numeral 16 represents a size of each of the unit areas. Each of numbers in a matrix represents a total sum of cable cross-sectional areas of the cables passing through the corresponding unit area, calculated from the cable wiring state management database according to the above-described embodiment. A black-painted portion represents an area where a cable cannot be laid. For example, a cable IDs included in each of the unit area numbers of the in-unit area cable table in FIG. 10 are extracted, cable cross-sectional areas of the cable information table linked with the respective cable IDs of the in-unit area cable table are extracted, and the total sum of cable cross-sectional areas in each of the unit areas is calculated.

Figure 17:
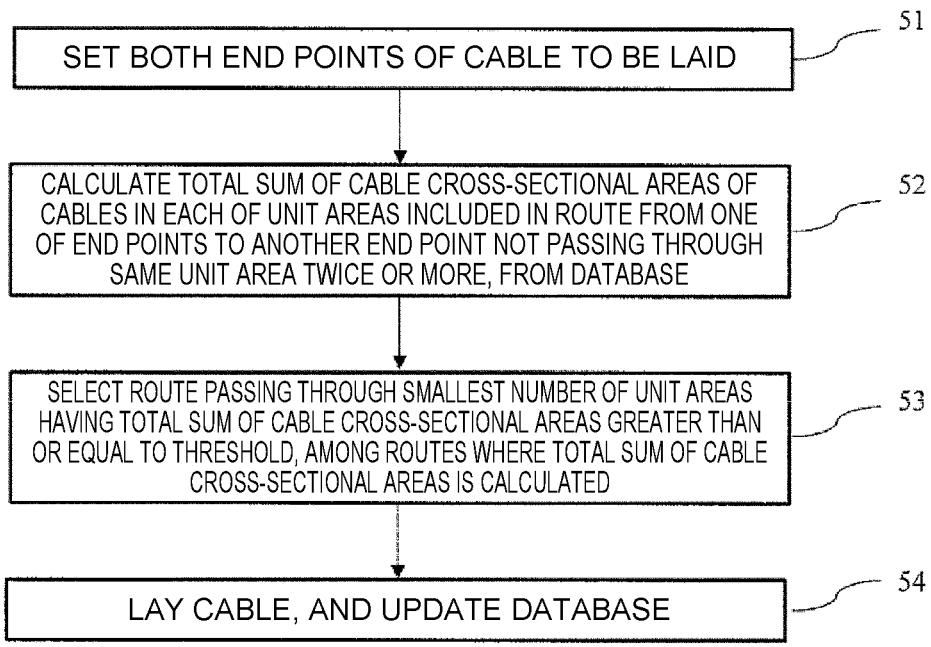
FIG. 17 illustrates an example of the procedure of the cable wiring method.

FIG. 17 illustrates an example of a procedure of the cable wiring method. Both end points (two end points in FIG. 16) for a cable to be laid are set among the unit areas of the floor where the cable is to be wired (step 51). Next, the total sum of cable cross-sectional areas of the cables in each of the unit areas included in a route from one of the end points to the other end point not passing through the same unit area twice or more is calculated from the cable wiring state management database according to the above-described embodiment (step 52). Among routes where the total sum of cable cross-sectional areas is calculated, a route passing through the smallest number of unit areas having the total sum of cable cross-sectional areas greater than or equal to the threshold is selected (step 53). The threshold of the total sum of cable cross-sectional areas is optionally set. After the route is selected, the cable is actually laid, and the above-described database is updated (step 54). The cable wiring state management database is illustrated in FIG. 9 and FIG. 10 according to the above-described embodiments.

For example, in FIG. 16, the threshold of the total sum of cable cross-sectional areas is set to 50. To simplify the route connecting the two end points, two routes of a clockwise route and a counterclockwise route from an upper end point in FIG. 16 as a starting point are assumed. The clockwise route and the counterclockwise route are compared. In the clockwise route, the total sum of cable cross-sectional areas becomes greater than or equal to the threshold 50 in two unit areas, and the total sums of cable cross-sectional areas of the respective unit areas are 57 and 57. In the counterclockwise route, the total sum of cable cross-sectional areas becomes greater than or equal to the threshold 50 in three unit areas, and the total sums of cable cross-sectional areas of the respective unit areas are 80, 68, and 68. Accordingly, the clockwise route is selected.

Utilizing the cable wiring method according to the present disclosure makes it possible to wire a cable so as not to generate bias in the areas where the cables pass. As a result, it is possible to improve air-conditioning efficiency and to improve workability in removal of a cable.

Figure 18:
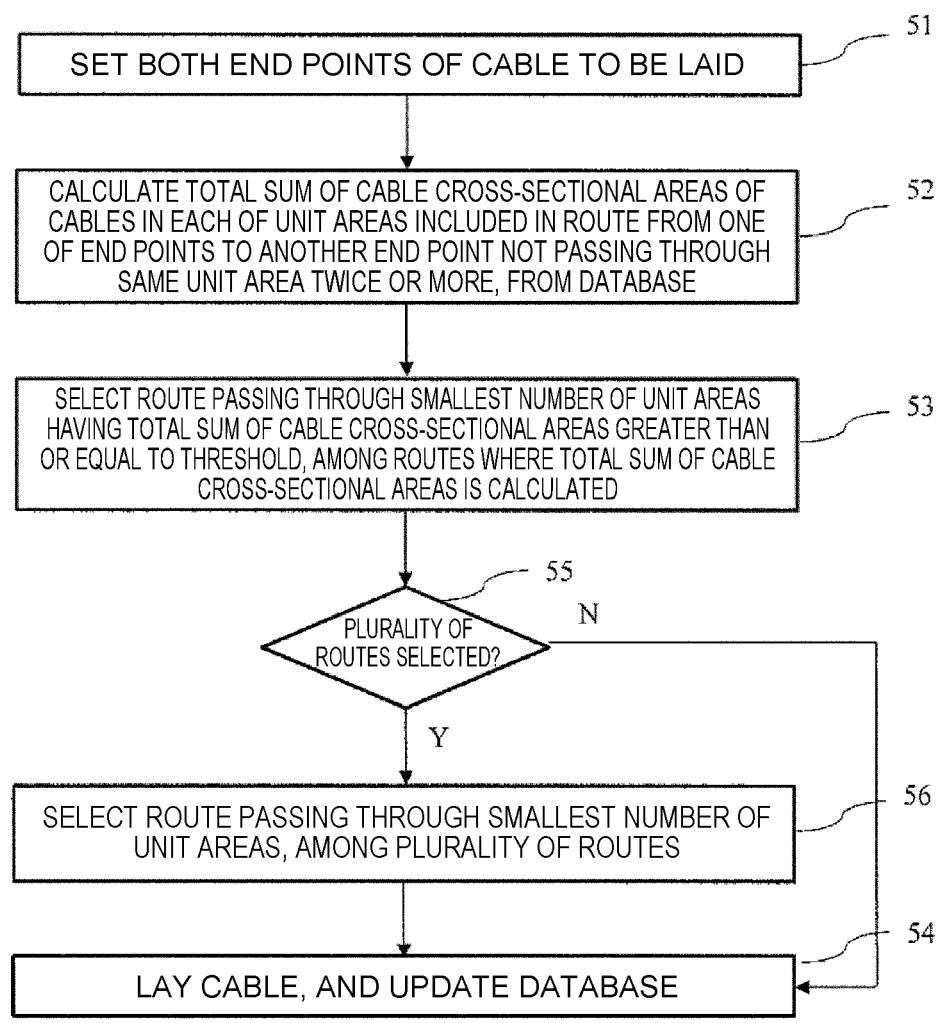
FIG. 18 illustrates an example of the procedure of the cable wiring method.

FIG. 18 illustrates an example of the procedure of the cable wiring method. In FIG. 18, steps 51, 52, 53, and 54 are similar to the steps in FIG. 17. In selection of the route passing through the smallest number of unit areas having the total sum of cable cross-sectional areas greater than or equal to the threshold (step 53) in FIG. 18, in a case where a plurality of routes is selected ("Y" in step 55), a route passing through the smallest number of unit areas is selected among the plurality of routes (step 56). In a case where one route is selected in step 53 ("N" in step 55), the procedure is similar to the procedure in FIG. 17. After one route is selected, the cable is actually laid, and the above-described database is updated (step 54).

For example, in FIG. 16, the threshold of the total sum of cable cross-sectional areas is set to 20. To simplify the route connecting the two end points, two routes of a clockwise route and a counterclockwise route from an upper end point in FIG. 16 as a starting point are assumed. The clockwise route and the counterclockwise route are compared. In the clockwise route, the total sum of cable cross-sectional areas becomes greater than or equal to the threshold 20 in seven unit areas, and the total sums of cable cross-sectional areas of the respective unit areas are 24, 28, 28, 29, 57, 42, and 57. In the counterclockwise route, the total sum of cable cross-sectional areas becomes greater than or equal to the threshold 20 in seven unit areas, and the total sums of cable cross-sectional areas of the respective unit areas are 24, 80, 68, 68, 43, 43, and 26. A plurality of routes is selected. In the clockwise route and the counterclockwise route, the numbers of unit areas where the cables pass are respectively 10 and 8. Accordingly, the counterclockwise route is finally selected.

Utilizing the cable wiring method according to the present disclosure makes it possible to wire a cable so as not to generate bias in the areas where the cables pass. As a result, it is possible to improve air-conditioning efficiency and to improve workability in removal of a cable.

(CFD Analysis Method)

In a CFD (Computational Fluid Dynamics) analysis method according to the present embodiment, unit areas are set in a floor where a cable is to be wired, a bottom surface of each of the unit areas is set as a bottom surface of a rectangular parallelepiped, a total sum of cable cross-sectional areas of cables passing through each of the unit areas is calculated from the cable wiring state management database according to the above-described embodiment, an apparent cross-sectional area is calculated by dividing the calculated total sum of cable cross-sectional areas by density of the cables, a height of the rectangular parallelepiped is calculated by dividing the apparent cross-sectional area by an average of a long side and a short side of the bottom surface of the rectangular parallelepiped, and CFD analysis is performed by approximating the cables passing through each of the unit areas to the rectangular parallelepiped having the bottom surface and the height.

Figure 19:
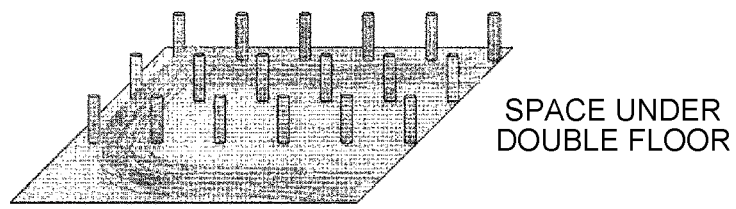
FIG. 19 illustrates an example in which cables in a space under a double floor are approximated to rectangular parallelepipeds.
Figure 19:
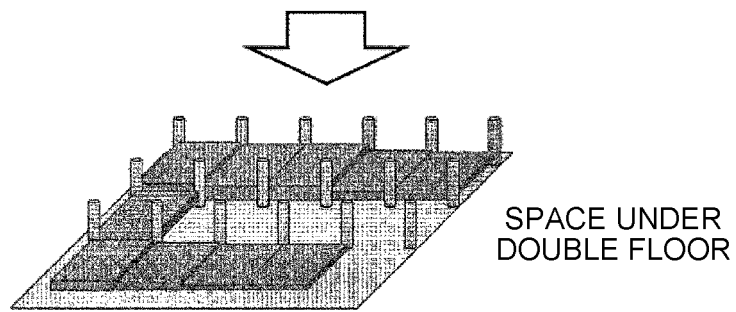

FIG. 19 illustrates an example in which cables in a space under a double floor are approximated to rectangular parallelepipeds. FIG. 19(a) illustrates a cable wiring state in the space under the double floor, and FIG. 19(b) illustrates the example in which the cables are approximated to the rectangular parallelepipeds. The cables are wired between both end points in the space under the double floor. As illustrated in FIG. 19(b), the CFD analysis is performed by approximating the cables to the rectangular parallelepipeds arranged in the unit areas.

FIG. 20 illustrates an example of a procedure of the CFD analysis. First, unit areas are set in a floor where a cable is to be wired (step 61). The cables passing through each of the unit areas are approximated to a rectangular parallelepiped (step 62 to step 66). To approximate the cables to the rectangular parallelepiped, a bottom surface of one of the unit areas is set as a bottom surface of the corresponding rectangular parallelepiped (step 62). Next, a height of the rectangular parallelepiped is determined (step 63 to step 65). A total sum of cable cross-sectional areas of the cables passing through the unit area is calculated from the cable wiring state management database according to the above-described embodiment (step 63). The total sum of cable cross-sectional areas is calculated in a manner described in the embodiment of the cable wiring method 2.

An apparent cross-sectional area is calculated from the calculated total sum of cable cross-sectional areas (step 64). The apparent cross-sectional area can be obtained by actually laying cables in the unit area and dividing the total sum of cable cross-sectional areas of the cables calculated from the cable wiring state management database by density of the cables actually laid. The density of the cables is not an individual value but an average value statistically obtained from measurement. It is assumed that a rate of about 40% is obtained from the measurement. For example, when the total sum of cable cross-sectional areas is 100 mm2 and is divided by the density of the cables of 40%, the apparent cross-sectional area is 250 mm2.

The value of the density can be obtained by acquiring the cross-sectional areas of the actually-wired cables with use of a 3D scanner, and comparing the acquired cross-sectional areas with the total sum of cable cross-sectional areas calculated from the cable wiring state management database.

A height of the rectangular parallelepiped is calculated by dividing the apparent cross-sectional area obtained in step 64 by an average of a long side and a short side of the rectangular parallelepiped (step 65). A shape of a panel surface of the double floor is normally a square or a rectangle close to a square. Therefore, the bottom surface of the rectangular parallelepiped is regarded as a square or a rectangle close to a square. In a case of the square, the height of the rectangular parallelepiped is calculated by dividing the apparent cross-sectional area by one side of the bottom surface of the rectangular parallelepiped. In a case of the rectangle, the height of the rectangular parallelepiped is calculated by dividing the apparent cross-sectional area by an average of a long side and a short side of the bottom surface of the rectangular parallelepiped. This is because, in a case where the bottom surface has a rectangle shape close to a square, large error does not occur even when the apparent cross-sectional area is divided by the average of the long side and the short side.

The cables passing through the unit area are approximated to a rectangular parallelepiped having the bottom surface of the rectangular parallelepiped obtained in step 62 and the height of the rectangular parallelepiped obtained in step 66 (step 66). These steps are repeated for each of the unit areas in the floor, to replace the cables in the space under the double floor with the approximated rectangular parallelepipeds as illustrated in FIG. 19(*b*). Thereafter, the CFD analysis is performed. Air-conditioning efficiency in the space under the double floor is estimated by the CFD analysis (step 67). When the air-conditioning efficiency can be estimated, temperature of air sucked by the communication devices and the servers can be predicted. It may be determined that the air-conditioning efficiency is low as the highest temperature of the temperature of the air sucked by the communication devices and the servers is higher.

In the CFD analysis method according to the present embodiment, since the cables passing through each of the unit areas are approximated to the rectangular parallelepiped, it is possible to reduce a calculation amount. As compared with a case where the CFD analysis is performed on the actual cables while a size of one side of a unit lattice used for calculation is set to 1 cm, when the CFD analysis is performed by approximating the cables to the rectangular parallelepiped while a size of one side of a unit lattice used for calculation is set to 5 cm, an analysis time can be reduced by 97%.

When such a CFD analysis method is applied to cable wiring, the air-conditioning efficiency can be estimated before a cable is actually laid, which makes it possible to obtain an optimum cable wiring method.

In the above-described embodiments, the cables are wired under a double floor; however, the present invention is applicable to a case where cables are wired in a cable ladder installed on the rack for the communication devices and the servers.

Steps 42, 43, 45, 46, 52, 53, 55, and 56 of the cable wiring methods and steps 62, 63, 64, 65, 66, and 67 of the CFD analysis method according to the present invention can be realized by a computer and computer programs. The computer programs can be recorded in a recording medium, or can be supplied through a network.

INDUSTRIAL APPLICABILITY

The present disclosure is applicable to information and communication industry.

REFERENCE SIGNS LIST

11 Communication cable integrated point
12 Power cable integrated point
13 Rack for communication devices and servers
14 Air-conditioning device
15 Cable
16 Unit area
100 Floor model

The invention claimed is:

1. A cable wiring method, comprising:
setting unit areas in a floor where cable is to be wired;
setting both end points for the cable to be laid among the unit areas of the floor where the cable is to be wired;
setting a bottom surface of each of the unit areas as a bottom surface of a rectangular parallelepiped;
calculating a total sum of cable cross-sectional areas of cables in each of the unit areas included in a route from one of the end points to another end point not passing through a same unit area twice or more, from a cable wiring state management database;
calculating an apparent cross-sectional area from the calculated total sum of the cable cross-sectional areas;
calculating a height of the rectangular parallelepiped by dividing the apparent cross-sectional area by average of long side and short side of the set bottom surface of the rectangular parallelepiped;
performing computational fluid dynamics (CFD) analysis by approximating cables passing through each of the unit areas to rectangular parallelepiped; and
in response to performing the CFD analysis, estimating an air conditioning efficiency in the floor where the cable is to be wired.

2. The cable wiring method according to claim 1, wherein, in a case where a plurality of routes is selected, a route passing through a smallest number of unit areas is selected among the plurality of routes.

3. The cable wiring method according to claim 1, further comprising:
selecting a route passing through a smallest number of unit areas having the total sum of the cable cross-sectional areas greater than or equal to a threshold, among routes where the total sum of cable cross-sectional areas is calculated.

4. The cable wiring method according to claim 3, wherein, in a case a plurality of routes is selected, a route passing through a smallest number of unit areas is selected among the plurality of routes.

5. A system comprising:
one or more computers and one or more storage devices storing instructions that are operable, when executed by the one or more computers, to cause the one or more computers to perform operations comprising:
setting unit areas in a floor where cable is to be wired;

setting both end points for the cable to be laid among the unit areas of the floor where the cable is to be wired;

setting a bottom surface of each of the unit areas as a bottom surface of a rectangular parallelepiped;

calculating a total sum of cable cross-sectional areas of cables in each of the unit areas included in a route from one of the end points to another end point not passing through a same unit area twice or more, from a cable wiring state management database;

calculating an apparent cross-sectional area from the calculated total sum of the cable cross-sectional areas;

calculating a height of the rectangular parallelepiped by dividing the apparent cross-sectional area by average of long side and short side of the set bottom surface of the rectangular parallelepiped;

performing computational fluid dynamics (CFD) analysis by approximating cables passing through each of the unit areas to rectangular parallelepiped; and in response to performing the CFD analysis, estimating an air conditioning efficiency in the floor where the cable is to be wired.

6. The system according to claim 5, wherein, in a case where a plurality of routes is selected, a route passing through a smallest number of unit areas is selected among the plurality of routes.

7. The system according to claim 5, further comprising:

selecting a route passing through a smallest number of unit areas having the total sum of the cable cross-sectional areas greater than or equal to a threshold, among routes where the total sum of cable cross-sectional areas is calculated.

8. The system according to claim 7, wherein, in a case a plurality of routes is selected, a route passing through a smallest number of unit areas is selected among the plurality of routes.

9. One or more non-transitory computer-readable media storing software comprising instructions that are operable, when executed by one or more computers, to cause the one or more computers to perform operations comprising:

setting unit areas in a floor where cable is to be wired;

setting both end points for the cable to be laid among the unit areas of the floor where the cable is to be wired;

setting a bottom surface of each of the unit areas as a bottom surface of a rectangular parallelepiped;

calculating a total sum of cable cross-sectional areas of cables in each of the unit areas included in a route from one of the end points to another end point not passing through a same unit area twice or more, from a cable wiring state management database;

calculating an apparent cross-sectional area from the calculated total sum of the cable cross-sectional areas;

calculating a height of the rectangular parallelepiped by dividing the apparent cross-sectional area by average of long side and short side of the set bottom surface of the rectangular parallelepiped;

performing computational fluid dynamics (CFD) analysis by approximating cables passing through each of the unit areas to rectangular parallelepiped; and in response to performing the CFD analysis, estimating an air conditioning efficiency in the floor where the cable is to be wired.

10. The one or more non-transitory computer-readable media according to claim 9, wherein, in a case where a plurality of routes is selected, a route passing through a smallest number of unit areas is selected among the plurality of routes.

11. The one or more non-transitory computer-readable media according to claim 9, further comprising:

selecting a route passing through a smallest number of unit areas having the total sum of the cable cross-sectional areas greater than or equal to a threshold, among routes where the total sum of cable cross-sectional areas is calculated.

12. The one or more non-transitory computer-readable media according to claim 11, wherein, in a case a plurality of routes is selected, a route passing through a smallest number of unit areas is selected among the plurality of routes.

* * * * *